(12) United States Patent
Bhowmik

(10) Patent No.: US 7,327,423 B2
(45) Date of Patent: Feb. 5, 2008

(54) RETARDATION COMPENSATOR FOR A LIQUID CRYSTAL-ON-SILICON IMAGER

(75) Inventor: Achintya K. Bhowmik, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 250 days.

(21) Appl. No.: 10/961,095

(22) Filed: Oct. 8, 2004

(65) Prior Publication Data

US 2006/0077318 A1    Apr. 13, 2006

(51) Int. Cl.
*G02F 1/1335* (2006.01)
(52) U.S. Cl. .................................... 349/117
(58) Field of Classification Search ............... 349/117
See application file for complete search history.

(56) References Cited

U.S. PATENT DOCUMENTS 5,308,535 A * 5/1994 Scheuble et al. ...... 252/299.01
2003/0231269 A1* 12/2003 Ma ............................ 349/115

OTHER PUBLICATIONS

Bhowmik, "Mutiple-Reflection Effects in Photoelastic Stress Analysis", Applied Optics, vol. 40, No. 16, Jun. 1, 2001, pp. 2687-2691.

* cited by examiner

*Primary Examiner*—James A. Dudek
(74) *Attorney, Agent, or Firm*—Trop, Pruner & Hu, P.C.

(57) ABSTRACT

Phase retardation compensation can be achieved in liquid crystal-on-silicon imagers by stress freezing a photoelastic medium. As a result, a simple, one-piece compensator for the residual birefringence of the imagers may be provided in some cases. The stress may be frozen by subjecting a photoelastic material to a desired stress and temperature regime, resulting in a material which exhibits birefringence due to a stress level which is fixed or frozen at the molecular level within the material.

8 Claims, 2 Drawing Sheets

RETARDATION COMPENSATOR FOR A LIQUID CRYSTAL-ON-SILICON IMAGER

BACKGROUND

This invention relates generally to liquid crystal-on-silicon (LCOS) imagers.

LCOS imagers are increasingly being applied in high definition rear projection televisions, as well as front projectors. One important characteristic of LCOS imagers is the contrast ratio, which is the ratio between the on and off reflectance. In order to provide a good contrast ratio, the liquid crystal cells induce a relative phase retardation of $\pi$ between the switched states of the reflected light. This may be achieved via electric field induced rotation of the liquid crystal molecules in the cell.

However, the molecules in the layers adjacent to the electrodes undergo incomplete rotation due to anchoring on the alignment layers, resulting residual birefringence that lowers the contrast. In such cases, an external birefringent plate may be attached to the panel to compensate for the inadequate phase retardation.

Currently, such compensators may be based on stretched polymer films sandwiched between two glass plates. These stretched polymer film compensators induce birefringence by stretching the polymer films. However, such birefringence may be non-uniform, resulting in a non-uniform dark state. Also, the stretch induced birefringence may degrade over time as the film relaxes. In addition, particles trapped in the sandwich may create defects in the dark state. As a result, the stretched film compensators have not been amenable to volume manufacturing and result in part-to-part variations.

Another existing compensator is based on a single crystalline thin plate that is difficult to grow in a large area and, hence, expensive.

Thus, there is a need for compensators to improve the contrast ratio in LCOS display imagers.

DETAILED DESCRIPTION

A retardation compensator for a liquid crystal-on-silicon (LCOS) microdisplay imager may be fabricated from a stress frozen photoelastic medium, resulting in a stable and volume manufacturable process.

Photoelastic solids exhibit the phenomenon of stress-dependent anisotropy of refractive index. (See A. K. Bhowmik, *Applied Optics*, Vol. 40, No. 16, pp. 2687-2691, 2001). The anisotropy in refractive index of the photoelastic medium due to internal stress is given by the following equation:

$$\Delta n(\sigma) = n_x - n_y$$
$$= -\frac{1}{2} n_0^3 (q_{11} - q_{12}) \sigma$$

where $n_0$ is the isotropic refractive index in the absence of stress, $q_{ij}$ are the photoelastic constants of the medium, and $\sigma$ is the uniaxial applied stress. The optical axes induced in a stressed photoelastic solid coincide with the principal stress axes directions, hence, the slow and fast axes orientation can be precisely controlled via application of an appropriate stress tensor.

To provide optimized contrast in an LCOS microdisplay imager, the retarder, based on the photoelastic material, may satisfy the following condition:

$$\sigma t = \frac{2B_r}{n_0^3 (q_{11} - q_{12})}$$

where t is the thickness of the compensator plate and $B_r$ is the residual birefringence of the LCOS cell.

As an example, an epoxy based photoelastic solid of Araldite brand epoxy adherence may be used which is available from Huntsman Advanced Materials Americas, Inc., Los Angeles, Calif. Araldite has a Young's modulus E of 3.3 GPa, a Poisson's ratio v of 0.36, a refractive index n of 1.6, and stress optical coefficients $q_{11}$ of $-7.2 \times 10^{-12}$ m$^2$/N, and $q_{12}$ of $-51 \times 10^{-12}$ m$^2$/N. As an example, a typical configuration of an LCOS microdisplay imager based on twisted nematic mode liquid crystal material may have approximately 20 nanometers residual birefringence. In order to compensate for this, a stress thickness product of the compensator may be from 20 to 1000 N/m, for example about 220 N/m. In the case of an 0.8" diagonal microdisplay panel, this value may be achieved by freezing approximately 0.5 to approximately 20N force, for example about 3.2N force in the photoelastic solid.

Suitable materials may have photoelastic properties and be transparent to visual light. "Photoelastic" means that the material changes refractive indices and developes birefringence under the application of stress. Typical photoelastic materials are derivatives of epoxy resin, thermosetting polyester such as Homalite 100 (available from Homalite, Wilmington, Del. 19804), polycarbonate, and urethane rubber. Such materials are included in the book *Experimental Stress Analysis* by James W. Dally, publication date February 1991 by McGraw-Hill Higher Education, ISBN:0070152187. The material may be selected by taking into consideration the photoelastic coefficient, optical absorption coefficient, cost, and long-term reliability, to give a few examples.

Figure 1:
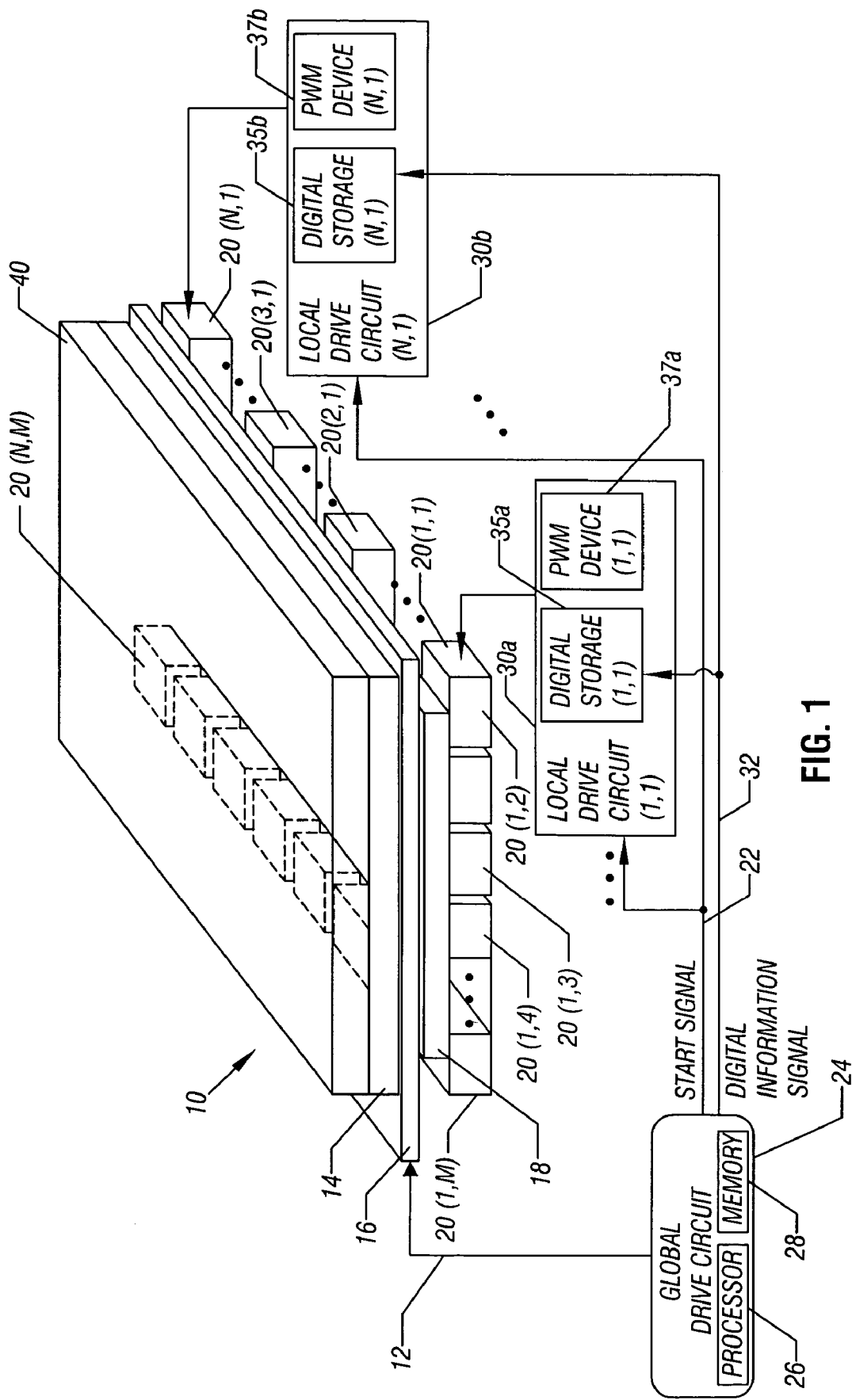
FIG. 1 is a schematic depiction of one embodiment of the present invention.

Referring now to FIG. 1, a display system 10 (e.g., a liquid crystal display (LCD), such as a spatial light modulator (SLM)) includes a liquid crystal layer 18 according to an embodiment of the present invention. In one embodiment, the liquid crystal layer 18 may be sandwiched between a transparent top plate 16 and a plurality of pixel electrodes 20(1, 1) through 20(N, M), forming a pixel array comprising a plurality of display elements (e.g., pixels). In some embodiments, the top plate 16 may be made of a transparent conducting layer, such as indium tin oxide (ITO). Applying voltages across the liquid crystal layer 18 through the top plate 16 and the plurality of pixel electrodes 20(1, 1) through 20(N, M) enables driving of the liquid crystal layer 18 to produce different levels of intensity on the optical outputs at the plurality of display elements, i.e., pixels, allowing the display on the display system 10 to be altered. A glass layer 14 may be applied over the top plate 16. In one embodiment, the top plate 16 may be fabricated directly onto the glass layer 14.

A global drive circuit 24 may include a processor 26 to drive the display system 10 and a memory 28 storing digital information including global digital information indicative of a common reference and local digital information indicative of an optical output from at least one display element, i.e., pixel. In some embodiments, the global drive circuit 24 applies bias potentials 12 to the top plate 16. Additionally, the global drive circuit 24 may provide a start signal 22 and a digital information signal 32 to a plurality of local drive circuits (1, 1) 30a through (N, 1) 30b, each of which may be associated with a different display element being formed by the corresponding pixel electrode of the plurality of pixel electrodes 20 (1, 1) through 20 (N, 1), respectively.

In one embodiment, a LCOS technology may be used to form the display elements of the pixel array. Liquid crystal devices formed using the LCOS technology may form large screen projection displays or smaller displays (using direct viewing rather then projection technology). Typically, the LC material is suspended over a thin passivation layer. A glass plate with an ITO layer covers the liquid crystal, creating the liquid crystal unit sometimes called a cell. A silicon substrate may define a large number of pixels. Each pixel may include semiconductor transistor circuitry in one embodiment. However, in other embodiments other digital modulation schemes and devices, for example, a digital light processor (DLP), such as a microelectromechanical systems (MEMS) device (e.g., a digital micromirror device) may be used.

One technique in accordance with an embodiment of the present invention involves controllably driving the display system 10 using pulse-width modulation (PWM). More particularly, for driving the plurality of pixel electrodes 20(1,1) through 20(N, M), each display element may be coupled to a different local drive circuit of the plurality of local drive circuits (1, 1) 30a through (N, 1) 30b, as an example. To hold and/or store any digital information intended for a particular display element, a plurality of digital storage (1, 1) 35a through (N, 1) 35b may be provided, each of which may be associated with a different local drive circuit of the plurality of local drive circuits (1, 1) 30a through (N, 1) 30b, for example. As discussed further below, such digital information may be used to determine a transition within a PWM waveform.

For generating a pulse-width modulated waveform based on the respective digital information, a plurality of PWM devices (1, 1) 37a through (N, 1) 37b may be provided in order to drive a corresponding display element. In one case, each PWM device of the plurality of PWM devices (1, 1) 37a through (N, 1) 37b may be associated with a different local drive circuit of the plurality of local drive circuits (1, 1) 30a through (N, 1) 30b.

In other embodiments, the device may be operated in an analog drive scheme instead of the digital pulse-width modulation (PWM) approach, where the drive voltage is changed continuously to produce different shades of gray. In still other embodiments, the drive scheme may be a combination of the aforesaid methods, e.g. a PWM technique with variable drive voltage level.

Consistent with one embodiment of the present invention, the global drive circuit 24 may receive video data input and may scan the pixel array in a row-by-row manner to drive each pixel electrode of the plurality of pixel electrodes 20(1,1) through 20(N, M). Of course, the display system 10 may comprise any desired arrangement of one or more display elements. Examples of the display elements include spatial light modulator devices, emissive display elements, non-emissive display elements and current and/or voltage driven display elements.

The compensator 40, shown in FIG. 1, may be precut to match the size of the cover glass 14, while preserving the required principle axes directions, and may be secured directly to the plate 14 using adhesive, for example. Alternatively, the compensator plate 40 may be mounted on a separate holder and positioned in front of the device 10.

The process of manufacturing the compensator involves forming a solid bar of the appropriate photoelastic medium from the molten liquid state using a molding process. The photoelastic solid may then be mounted in a stress fixture within a temperature controlled thermal chamber.

Figure 2:
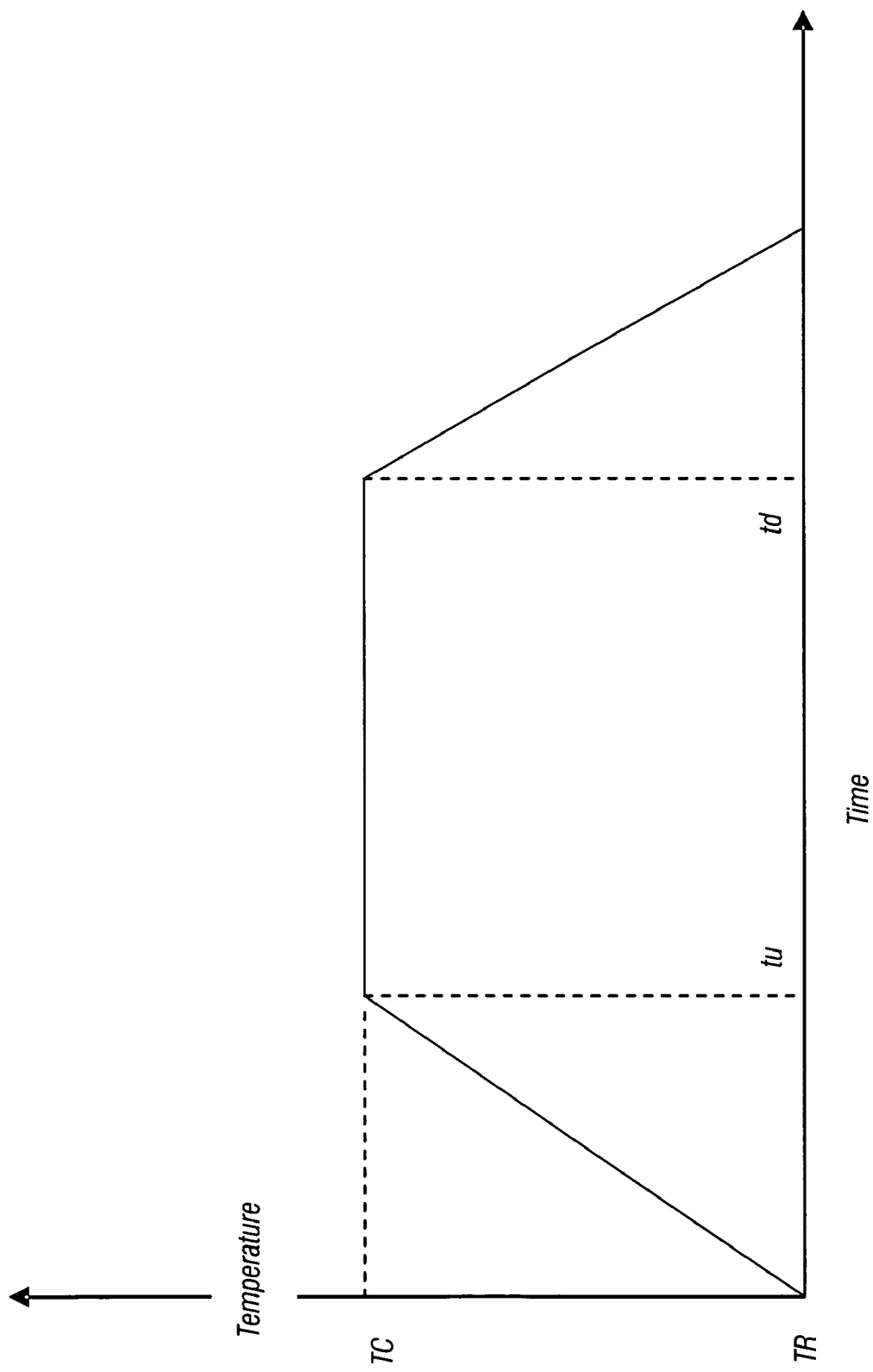
FIG. 2 is a plot of temperature versus time in the process of making the compensator in accordance with one embodiment of the present invention.

The temperature in the chamber may then be ramped up at a linear rate from room temperature TR, as shown in FIG. 2, to the predetermined critical temperature TC. Stresses and moments are then applied to the material by simply subjecting the object to the required level of load. The load, both in terms of magnitude and direction to achieve a desired level of stress, may be calculated using standard principles of mechanics. The reference book cited above may be used for this purpose.

The object is held under the applied load at the critical temperature for an appropriate time, during which time the molecules within the solid reorient according to the internal stress. TC is the critical temperature of a polymeric material exhibiting diphase behavior when it is heated and is the basis for the stress-freezing phenomenon. Once the material is selected, TC can be determined experimentally. The values tu for the ramp up and td for the beginning of the ramp down may be selected to allow the molecules to reorient under the influence of stress or to reach the critical temperature, as the case may be. These may be determined experimentally for the material of choice.

Then, holding the material under stress at the critical temperature and subsequent linear ramp down of the temperature may be utilized to lock the molecules in the stress state. The process freezes the stress-induced deformations in the solid at a molecular level.

The stress frozen photoelastic solid is then sliced to obtain compensator plates with the required thicknesses to yield the necessary phase retardation. Generally, the thickness may be in the range of 0.2 to 10 millimeters, depending on the elasto-optic coefficients of the material used.

In order to obtain good quality surface with uniform thickness, the slices may be cut a little thicker than desired and then subjected to a chemical-mechanical polish step to obtain the desired target thickness. An antireflective coating may also be applied to individual compensator plates prior to installation in the LCOS system.

In some embodiments, the retardation compensator plates yield uniform and stable birefringence through a volume manufacturable process. As a result, the contrast ratio and dark state brightness non-uniformity of LCOS displays may be improved in some cases.

These retarders may also be low cost in some cases because of the much simpler configuration. While currently used retarders employ either delicately stretched polymer films that are sandwiched between two glass plates with optical adhesives or expensive single crystalline thin plates, the retarder described herein may be a monolithic plate sliced out of an appropriately stress frozen photoelastic solid in one embodiment. Because of its simpler architecture and volume manufacturable process, superior thickness uniformity may be achieved over existing solutions in some cases.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A liquid crystal-over-silicon imager comprising:
   a liquid crystal material; and
   a stress frozen photoelastic solid secured over said liquid crystal material wherein the stress thickness product of the solid is approximately two times the residual birefringence of the imager divided by the isotropic refractive index cubed times the difference between the photoelastic constants of the solid.

2. The imager of claim 1 wherein said solid includes a material selected from the group including epoxy resin, Homalite 100, polycarbonate, and urethane rubber.

3. The imager of claim 1 wherein the stress thickness product is approximately in the range of 20-1000 N/m.

4. The imager of claim 3 with from approximately 0.5 to approximately 20 N of frozen effective force in the solid.

5. A retardation compensator for a liquid crystal-on-silicon imager comprising:
   a photoelastic medium with frozen internal stress to compensate for birefringence of said imager wherein the stress thickness product of the medium is approximately two times the residual birefringence of the imager divided by the isotropic refractive index cubed times the difference between the photoelastic constants of the solid.

6. The compensator of claim 5 wherein said medium includes a material selected from the group including epoxy resin, thermosetting polyester, polycarbonate, and urethane rubber.

7. The compensator of claim 5 wherein said medium has a thickness of from 0.2 to 10 mm.

8. A retardation compensator for a liquid crystal-on-silicon imager comprising:
   a photoelastic medium with frozen internal stress to compensate for birefringence of said imager wherein said medium has a thickness of from 0.2 to 10 mm.

* * * * *